United States Patent [19]
Froment et al.

[11] Patent Number: 5,685,346
[45] Date of Patent: Nov. 11, 1997

[54] ADJUSTABLE CLIP ELEMENTS FOR RIGIDLY CONNECTING OSCILLATING ARMS OF A WEAVING CONTROL SYSTEM

[75] Inventors: Jean-Paul Froment, Doussard; André Fumex, Talloires, both of France

[73] Assignee: Staubli Faverges, Faverges, France

[21] Appl. No.: 648,402

[22] Filed: May 15, 1996

[30] Foreign Application Priority Data

May 24, 1995 [FR] France .................................. 95 06416

[51] Int. Cl.[6] .................................................. D03C 1/14
[52] U.S. Cl. ........................ 139/57; 403/316; 403/374
[58] Field of Search ................................. 403/316, 374; 139/57, 58

[56] References Cited

U.S. PATENT DOCUMENTS

| | | | |
|---|---|---|---|
| 5,345,973 | 9/1994 | Vinciguerra | 139/57 |
| 5,462,093 | 10/1995 | Froment | 139/57 |

FOREIGN PATENT DOCUMENTS

| | | |
|---|---|---|
| 252177 | 7/1986 | European Pat. Off. . |
| 633335 | 1/1995 | European Pat. Off. . |
| 2398136 | 1/1980 | France . |

Primary Examiner—Andy Falik
Attorney, Agent, or Firm—Dowell & Dowell

[57] ABSTRACT

Adjustable clip elements for assembling oscillating arms of a weaving central system with engaging rods of a drawing system associated with heddle frames of a weaving loom. Each clip element includes a frame having pairs of lateral guides for two pairs of jaw assemblies provided in a slide block and associated with moveable wedges. The wedges are controlled with an adjusting mechanism arranged to urge one wedge towards the base of the slide block while urging the other wedge in the opposite direction.

11 Claims, 3 Drawing Sheets

ADJUSTABLE CLIP ELEMENTS FOR RIGIDLY CONNECTING OSCILLATING ARMS OF A WEAVING CONTROL SYSTEM

BACKGROUND OF THE INVENTION

FIELD OF THE INVENTION

The present invention relates to weaving systems for forming the shed in weaving looms and more particularly to the adjustable clip elements which ensure pivoting assembly of the oscillating arms of the system with the engaging rods of the drawing system associated with the heddle frames of the loom.

HISTORY OF THE RELATED ART

As shown schematically in FIG. 1 of the accompanying drawings, such a clip element, referenced 1, may be immobilized in any position along the axis of one of the oscillating arms 2 (arrow F1) of the system 3, which makes it possible to adjust the amplitude of the vertical stroke of the heddle frame CL which is coupled to the engaging rod 4. Furthermore, the point of coupling 5 provided by the clip element 1 for articulation of the rod 4 may be displaced in the direction of arrow F2, consequently allowing adjustment of the height of the frame CL with respect to the weaving loom.

Document FR-A-2 398 136 (STAUBLI) discloses an adjustable clip element constituted by a tubular piece 6 (cf. FIG. 2) forming a frame, which bears at one of its ends the pin 5 of the point of coupling. This piece 6 has a notch 6a cut out therein, which is traversed with clearance by the oscillating arm 2, which is surrounded on three sides by the bottom of a stirrup element 7 oriented axially inside the piece 6 and moveable therein in the manner of a slide block. Immobilization of this stirrup or slide block 7 along the arm 2 is ensured by a jaw element 8 controlled by two opposite lateral ramps 9 themselves actuated with the aid of a central wedge 10. The latter is associated with a thrust screw 11 screwed in the tapping of a block 12 secured to the free ends of the branches of the stirrup 7; this block 12 receives the action of an adjusting screw 13 with two opposite threads, which cooperates with a spacer 14 carried by an end of the piece 6 opposite end equipped with the pin 5.

It will be understood that the screw 13 allows adjustment of the axial position of the piece 6 with respect to the slide block or stirrup 7 and consequently of the pin 5 with respect to the rod 4, and the screw 11 ensures immobilization of this piece 6 at the desired height along the arm 2.

However, it should be observed that the lateral cheeks of the tubular piece 6 extend over the distance PF separating the pin 5 from the edge of the notch 6a facing towards the spacer 14, while very considerable transverse and axial forces are exerted on these cheeks, induced by the essentially variable inclination of the rod 4. As the very close side-by-side arrangement of the oscillating arms 2 of the system 3 prevents, in practice, any excess thickening for reinforcement, the cheeks can break and the performances of the system are in practice limited.

With a view to overcoming this drawback, documents EP-A-0 633 335 (STAUBLI) and EP-A-0 252 177 (KAISER) in particular propose providing the open-work frame with moveable clamping jaws disposed inside the stirrup on either side of the arm and arranging the adjusting mechanism so that it acts simultaneously on all the jaws.

Although such a structure does eliminate virtually all unreinforced extension of the clip element against the oscillating arm with which it is associated, nonetheless substantial shortcomings are still encountered which, in the case of EP-A-0 633 335, result from the wear caused by the clearance necessarily provided between the component parts, and, in the case of EP-A-0 252 177, from the complexity and fragility of the different elements of the assembly.

It is an object of the present invention to overcome these non-negligible drawbacks.

SUMMARY OF THE INVENTION

The present invention relates to an adjustable clip element for connecting an oscillating arm of a weaving control system with engaging rods of a drawing system associated with a heddle frame of a weaving loom. The clip element includes a frame in which a stirrup or slide block is mounted and which includes a pair of branch elements which extend on opposite sides of an oscillating arm engaged therethrough. The clip element is equipped with an adjusting mechanism arranged to act on moveable pairs of clamping jaws disposed inside the slide block on each side of the oscillating arm in order to secure the frame to the oscillating arm while permitting adjustment in the position of the frame perpendicularly to the axis of the oscillating arm. The frame is provided with a first pair of laterally spaced guides for a first pair of clamping jaws associated with a first moveable wedge engaged at a base and between the branch elements of the slide block and with two second lateral guides for a second pair of two jaws which are associated with a second moveable wedge. The first and second wedges are disposed on the opposite portions of the oscillating arm and between the branch elements of the slide block. In the preferred embodiment, the adjusting mechanism comprises a screw engaged in a tapped opening of a spacer fixed between free ends of the branch elements of the slide block which is arranged to urge the second wedge towards the base of the slide block while drawing the first wedge in an opposite direction to thereby bind the oscillating arm therebetween.

BRIEF DESCRIPTION OF THE DRAWINGS

The invention will be more readily understood on reading the following description with reference to the accompanying drawings, in which:

As indicated hereinabove, FIG. 1 illustrates the function of an adjustable clip element, while

DESCRIPTION OF PREFERRED EMBODIMENT

Figure 3:
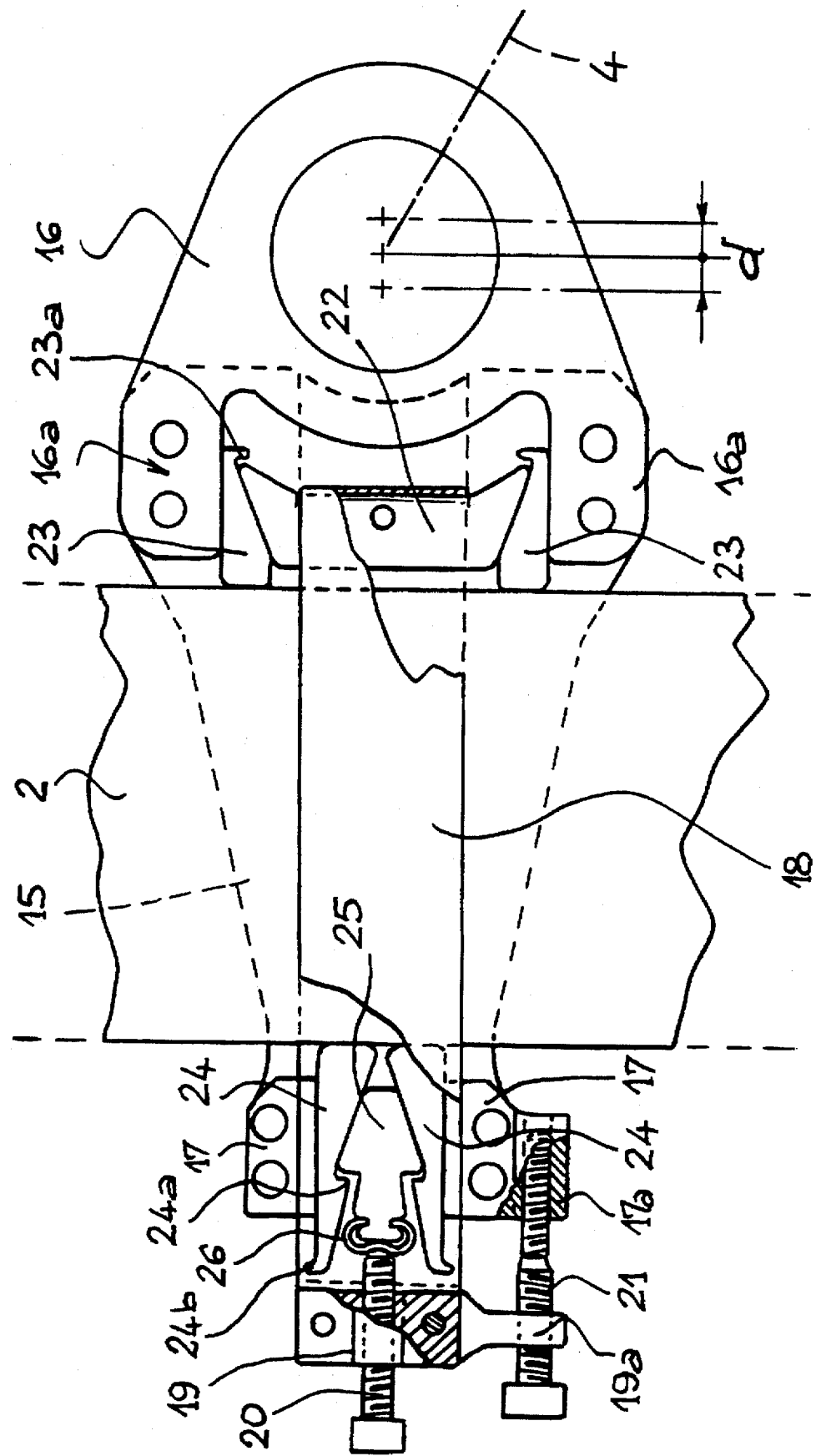
FIG. 3 is a side view with parts broken away, representing a clip element according to the present invention.
Figure 4:
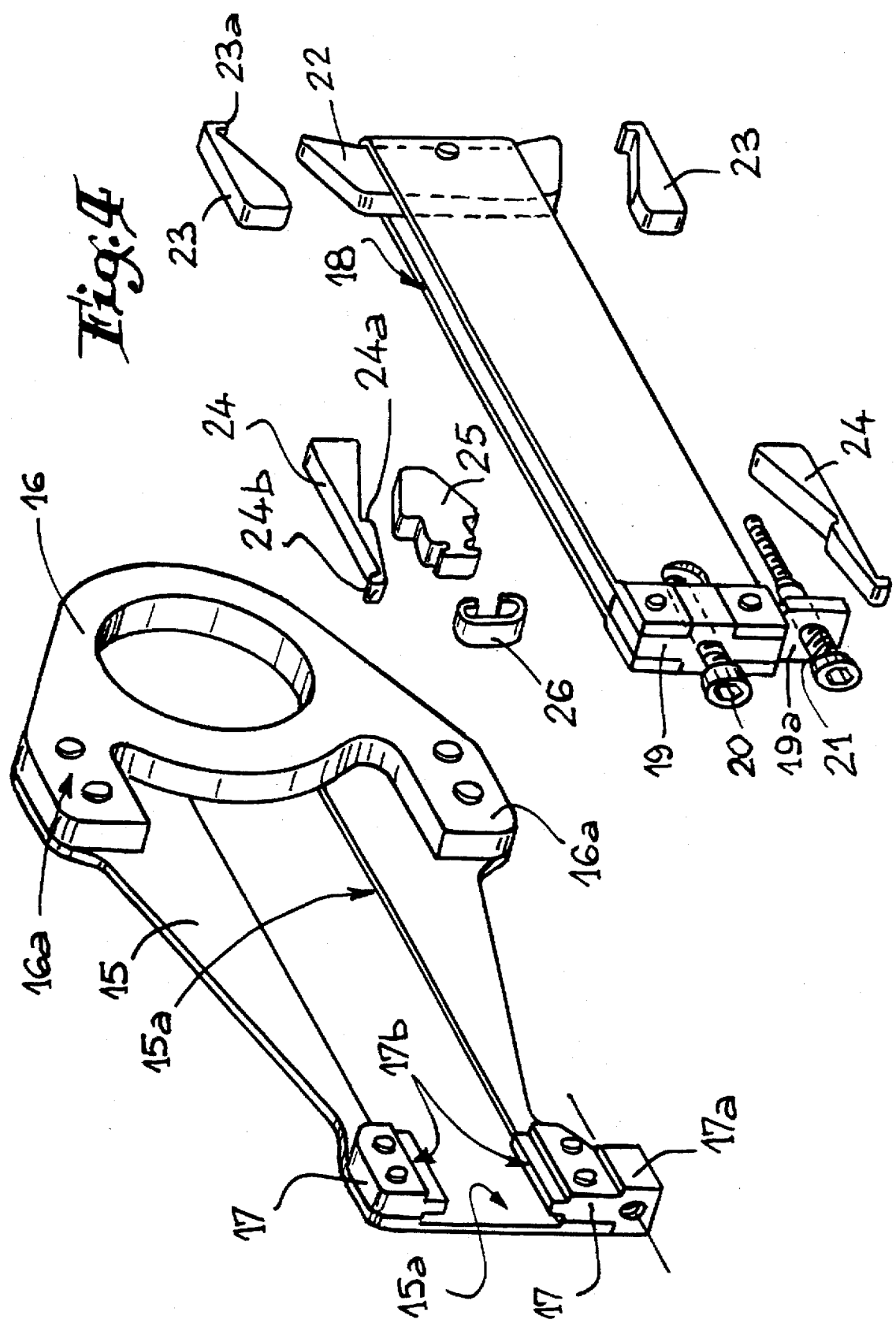
FIG. 4 shows in perspective the different elements constituting the clip element of FIG. 3, prior to assembly thereof.

Referring again to the drawings, the clip element shown in FIGS. 3 and 4 comprises a principal piece 15 forming a frame, constituted by a body against one of the faces of which are added, by riveting in the embodiment shown, on the one hand, an eyelet 16 adapted to receive the pin for the articulated coupling of the engaging rod 4 of the drawing system associated with the weaving system, on the other hand (in fact in the vicinity of the opposite end of the body), two projecting guides 17. It will be observed that the eyelet 16 presents two parts 16a also forming guides, as will be more readily understood hereinafter.

With frame 15 thus arranged there is associated a slide block 18 in the form of a stirrup which opens opposite the eyelet 16; the free ends of the two branches of this slide block 18 are joined to each other by a spacer 19 pierced with a central tapping inside which is engaged a thrust screw 20. In a lateral lug 19a of the pacer 19 there is screwed one of the two opposite threads of a double adjusting screw 21, the other thread cooperating with a tapping made in a lateral lug 17a of one of the two guides 17 of the frame 15.

The bottom of the stirrup 18 is equipped with a projecting wedge 22 of which the oblique edges cooperate with two sectioned jaws 23 which abut laterally against the guides 16a. Similarly, the guides 17 form abutments for two sectioned jaws 24 cooperating with a central wedge 25. It will be noted that a spring 26 is interposed between the opposite end of the wedge 25 and of the thrust screw 20.

The functioning and mode of use of the clip element which has just been described follow from the foregoing explanations and are readily understood.

The clip element in the mounted state is firstly engaged on the oscillating arm 2. It suffices to introduce the stirrup 18 on the arm 2 which is housed between the two branches of the stirrup, in that portion thereof included between the central jaw 22 and the two lateral jaws 24.

The screw 20 is then tightened slightly to transmit to the wedge 25, via the spring 26, and from there to the two jaws 24, a slight pressure. At the same time, the screw 20 acts, by traction on the stirrup via the spacer 19, on the wedge 22 and from there, on the jaws 23. In this way, the reduced tightening of the screw 20 temporarily prevents sliding of the clip element along the arm 2, the slight friction obtained compensating the effect of gravity up to the moment of complete tightening.

The operator then adjusts the adjusting screw 21 to displace the frame 15 and consequently the eyelet 16 (distance d of FIG. 3), with respect to the stirrup as a function of the height desired for the heddle frame CL.

Finally, the operator tightens the screw 20 to ensure final locking of the clip element, i.e. to fix on the one hand its position along the arm 2 as a function of the amplitude of the stroke desired for the heddle frame CL in question, and on the other hand, the position of the eyelet 16. This double locking results from the simultaneous action of the ramps of wedges 22 and 25 on the conjugate ramps of the jaws 23 and 24, the screw 20 pushing the central wedge 25 in the direction of the bottom of the stirrup while pulling the wedge 22 in the opposite direction.

Figure 1:
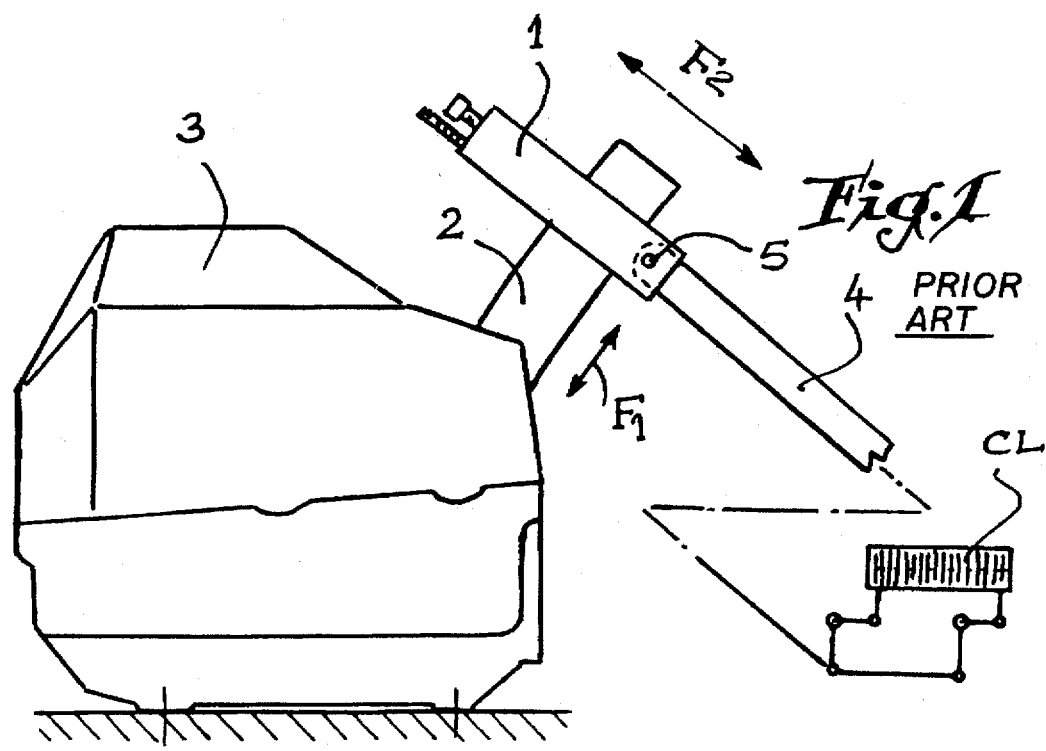
Figure 2:
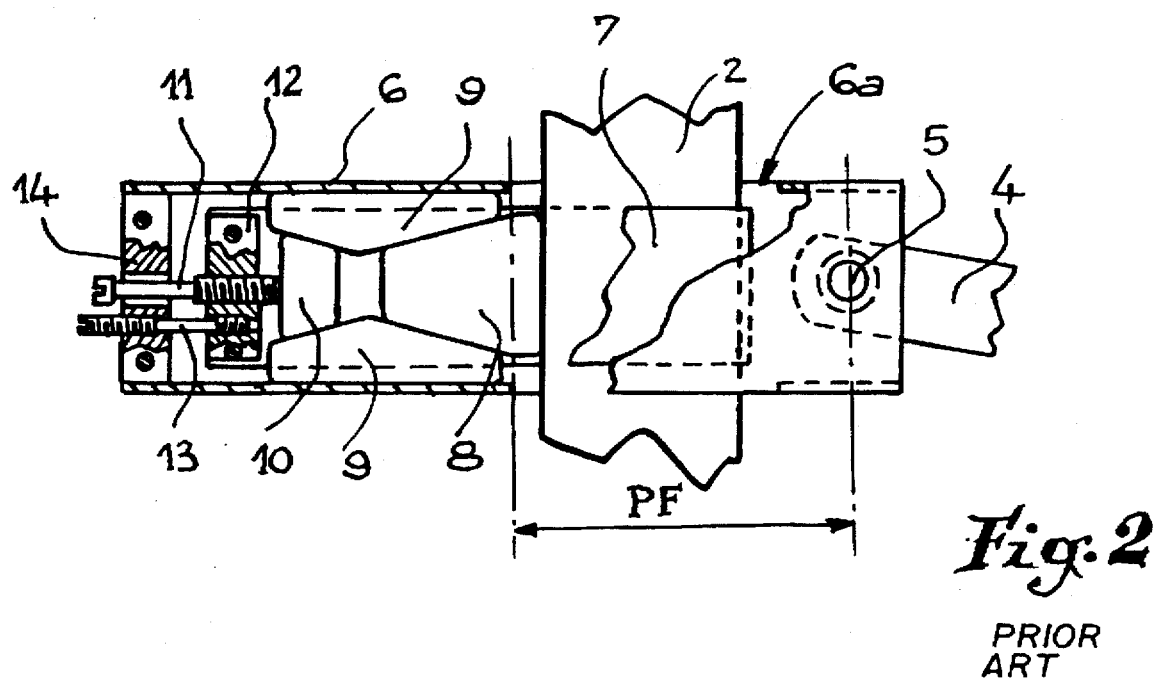
FIG. 2 illustrates the prior art disclosed by document FR-A-2 398 136 mentioned above.

Although this mode of use is in the end virtually identical to that of the prior-art clip elements of FIG. 2, a much greater robustness is nonetheless obtained, without the dimensions being substantially modified. The tightening effected on either side of the arm 2 with the aid of the jaws 23 and 24 abutting against the guides or bearing surfaces 16a and 17 which are perfectly rigid, opposes any untimely bending, whatever the stresses imparted to the eyelet 16 by the rod 4 when the loom is operating. Any detrimental effect of the extension of the frame is likewise eliminated, while the construction remains simple, requiring, moreover, no clearance capable of generating premature wear and tear of the parts.

It is interesting to observe that the guiding of the frame 15 on the slide block or stirrup 18 is advantageously improved by providing the frame with a longitudinal depression referenced 15a in FIG. 4, and providing guides 17 with a projection 17b adapted to engage between the two flanges of the stirrup.

It may further, be noted that the jaws 23 and 24 advantageously hooked and portions which ensure that they are held in position when the clip element is not on the lever. Each jaw 23 thus includes a hook 23a directed towards the opposite jaw 23, at its end opposite arm 2. Each jaw 24 comprises its length and approximately half way along, behind the wedge 25, a shoulder 24a directed towards the other jaw 24, and likewise at its end opposite arm 2, a hook 24b directed in the direction opposite the other jaw 24.

It will be appreciated that thrust and adjusting mechanisms different from the screws 20 and 21 mentioned hereinabove may be adopted for securing the clip element along the oscillating arm and for displacing the frame with respect to the stirrup or slide block.

What is claimed is:

1. An adjustable clip element for pivotally connecting an oscillating arm of a weaving control system with an engaging rod of a drawing system associated with a heddle frame of a weaving loom, the clip element comprising:

a frame having a body portion and first and second ends, a slide block moveably mounted relative to said frame and having a base and a pair of branch members adapted to extend on opposite sides of the oscillating arm, each of said branch members having free end portions, said frame having two first lateral guides adjacent said first end thereof, and two second lateral guides adjacent said first end thereof, a first pair of spaced clamping jaws slidably mounted adjacent said two first lateral guides and adapted to clampingly engage a first edge of the oscillating arm, said first pair of clamping jaws being engaged on opposite beveled sides of a first wedge member seated within said slide block adjacent said base thereof, a second pair of clamping jaws slidably mounted adjacent said second end of said frame adjacent said two second lateral guides and adapted to clampingly engage a second edge of the oscillating arm opposite the first edge thereof, said second pair of clamping jaws being engaged on opposite beveled sides of a second wedge member mounted therebetween, and a first adjusting means mounted to said branch members of said slide block adjacent said free end portions thereof, said first adjusting means being engageable with said second wedge member so as to urge second wedge member toward said base of said slide block while simultaneously urging said first wedge member toward free end portions of said branch members of said slide block and thereby moving said first and second pairs of clamping jaws toward one another whereby said first and second pairs of clamping jaws are adapted to be urged against the first and second opposite edges of the oscillating arm to thereby clamp said frame of the adjustable clip element to the oscillating arm while simultaneously reinforcing said frame.

2. The adjustable clip element of claim 1 wherein said first adjusting means includes a spacer mounted to said slide block adjacent said free end portions thereof, a first tapped opening in said spacer, and a first adjusting screw adjustably mounted within said first tapped opening.

3. The adjustable clip element of claim 2 in which said first adjusting means further includes a spring means mounted between said first adjusting screw and an end portion of said second wedge member, said spring means normally acting to provide a force to urge said second wedge member and said second pair of said clamping jaws toward said base of said slide block.

4. The adjustable clip element of claim 3 including a second adjusting means including a second adjusting screw having two oppositely oriented thread portions, a second tapped opening through said spacer spaced from said first tapped opening, a lateral lug element extending from said second end of said frame and having a third tapped opening therein in which one of said two oppositely oriented thread portions of said second adjusting screw is adjustingly received with the other of said two oppositely oriented thread portions of said second adjusting screw being threadingly received through said second tapped opening of said spacer.

5. The adjustable clip element of claim 4 wherein said two first lateral guides are integrally formed with an eyelet secured to first end portion of said frame and said two second lateral guides are formed by a pair of spaced lateral projections extending from said second end of said frame.

6. The adjustable clip element of claim 5 wherein said body of said frame includes a longitudinal depression therein forming a guide for cooperatively seating one of said branch members of said slide block therein.

7. The adjustable clip element of claim 6 wherein said spaced lateral projections extend between said branch members of said slide block.

8. The adjustable clip element of claim 2 including a second adjusting means including a second adjusting screw having two oppositely oriented thread portions, a second tapped opening through said spacer spaced from said first tapped opening, a lateral lug element extending from said second end of said frame and having a third tapped opening therein in which one of said two oppositely oriented thread portions of said second adjusting screw is adjustingly received with the other of said two oppositely oriented thread portions of said second adjusting screw being threadingly received through said second tapped opening of said spacer.

9. The adjustable clip element of claim 1 wherein said two first lateral guides are integrally formed with an eyelet secured to first end portion of said frame and said two second lateral guides are formed by a pair of spaced lateral projections extending from said second end of said frame.

10. The adjustable clip element of claim 9 wherein said spaced lateral projections extend between said branch members of said slide block.

11. The adjustable clip element of claim 1 wherein said body of said frame includes a longitudinal depression therein forming a guide for cooperatively seating one of said branch members of said slide block therein.

* * * * *